US010883588B2

(12) United States Patent
Ketchel et al.

(10) Patent No.: US 10,883,588 B2
(45) Date of Patent: Jan. 5, 2021

(54) DIFFERENTIAL ASSEMBLY WITH TWO-PIECE CARRIER AND WELDED RING GEAR

(71) Applicant: MAGNA POWERTRAIN OF AMERICA, INC., Troy, MI (US)

(72) Inventors: Bradley Ketchel, Oxford, MI (US); Wade Smith, Mussey, MI (US); Ryan Shaw, Southfield, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 127 days.

(21) Appl. No.: 16/068,692

(22) PCT Filed: Feb. 8, 2017

(86) PCT No.: PCT/US2017/016924
§ 371 (c)(1),
(2) Date: Jul. 9, 2018

(87) PCT Pub. No.: WO2017/139322
PCT Pub. Date: Aug. 17, 2017

(65) Prior Publication Data
US 2019/0056019 A1    Feb. 21, 2019

Related U.S. Application Data

(60) Provisional application No. 62/293,539, filed on Feb. 10, 2016.

(51) Int. Cl.
*F16H 48/08*  (2006.01)
*F16H 48/40*  (2012.01)
(Continued)

(52) U.S. Cl.
CPC ............ *F16H 48/40* (2013.01); *F16H 48/08* (2013.01); *F16H 48/38* (2013.01); *B60K 17/346* (2013.01);
(Continued)

(58) Field of Classification Search
None
See application file for complete search history.

(56) References Cited

U.S. PATENT DOCUMENTS 3,955,443 A  *  5/1976  Estrada ................... F16H 48/08
                                                        475/230
4,125,026 A      11/1978  Torii et al.
(Continued)

FOREIGN PATENT DOCUMENTS

DE    102009056087 A1    6/2011
DE    102013109835 A1    3/2015

OTHER PUBLICATIONS

International Search Report and Written Opinion dated May 5, 2017 in International Application No. PCT/US2017/016924.

*Primary Examiner* — Charles A Fox
*Assistant Examiner* — Ryan P Dodd
(74) *Attorney, Agent, or Firm* — Dickinson Wright PLLC

(57) ABSTRACT

A differential assembly is provided to include a two-piece differential carrier, a differential gearset installed within a gearset chamber formed in the differential carrier, and a ring gear. An interlocking feature mechanically interconnects the ring gear to the first and second case members of the two-piece differential carrier and defines first and second weldment junctions. A first weld seam is located in the first weldment junction and connects the ring gear to the first case member while a second weld seam is located in the second weldment junction and connects the ring gear to the second case member.

19 Claims, 10 Drawing Sheets

(51) Int. Cl.
  *F16H 48/38*    (2012.01)
  *B60K 17/346*   (2006.01)
  *B60K 17/35*    (2006.01)

(52) U.S. Cl.
  CPC .......... *B60K 17/3462* (2013.01); *B60K 17/35* (2013.01); *F16H 2048/085* (2013.01); *F16H 2048/385* (2013.01)

(56) References Cited

U.S. PATENT DOCUMENTS

| | | | |
|---|---|---|---|
| 6,045,479 | A | 4/2000 | Victoria et al. |
| 6,139,462 | A * | 10/2000 | Gage ........................ C21D 1/09 |
| | | | 475/248 |
| 6,176,152 | B1 | 1/2001 | Victoria et al. |
| 6,589,671 | B1 * | 7/2003 | Kehrer ............... B23K 15/0073 |
| | | | 428/683 |
| 6,945,898 | B2 | 9/2005 | Szuba |
| 7,261,664 | B2 | 8/2007 | Szuba |
| 8,444,522 | B2 | 5/2013 | Cripsey et al. |
| 8,808,127 | B2 * | 8/2014 | Seidl ........................ B60K 6/52 |
| | | | 475/150 |
| 8,845,475 | B2 * | 9/2014 | Mayr .................... F16H 57/037 |
| | | | 475/220 |
| 2009/0205463 | A1 * | 8/2009 | Gianone ................ B23K 26/28 |
| | | | 74/606 R |
| 2009/0266198 | A1 * | 10/2009 | Nosakowski ........... F16H 48/08 |
| | | | 74/606 R |
| 2012/0325047 | A1 * | 12/2012 | Cripsey .................. F16H 48/40 |
| | | | 74/606 R |
| 2016/0356372 | A1 * | 12/2016 | Zalewski ................ F16H 48/40 |

* cited by examiner

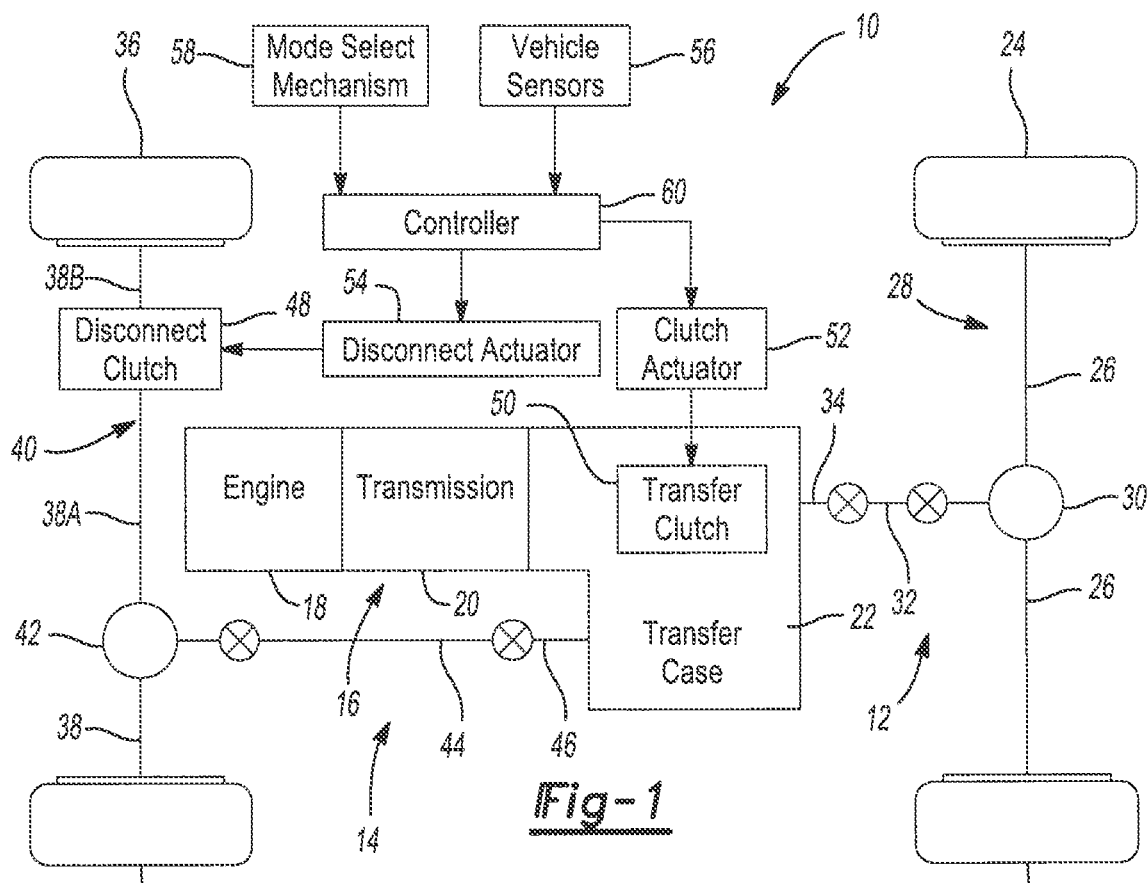
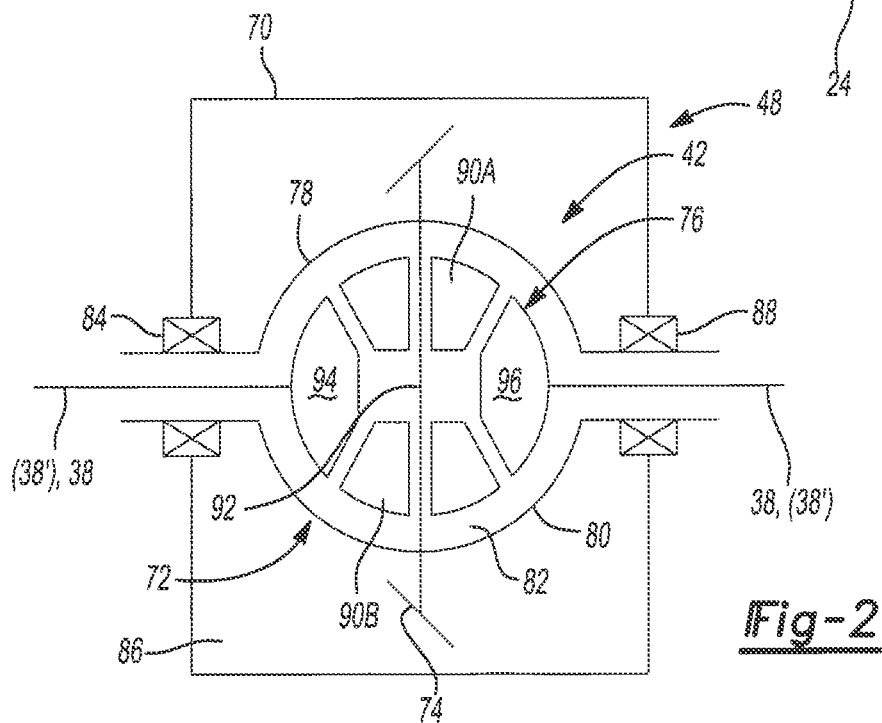

DIFFERENTIAL ASSEMBLY WITH TWO-PIECE CARRIER AND WELDED RING GEAR

CROSS REFERENCE TO RELATED APPLICATIONS

This application is National stage of International Application No. PCT/US2017/016924 filed Feb. 8, 2017 and which claims the benefit and priority of U.S. Provisional Application No. 62/293,539 filed on Feb. 10, 2016. The entire disclosure of each of the above applications is incorporated herein by reference.

TECHNICAL FIELD OF THE INVENTION

The present disclosure relates generally to differential assemblies for use in motor vehicle drivelines. More particularly, the present disclosure relates to a differential assembly configured to establish a pair of weldment junctions for rigidly interconnecting the two case members of a two-piece differential carrier to a ring wear, and further relates to a method of assembling such a differential assembly.

BACKGROUND OF THE INVENTION

This section provides background information related to the present disclosure which is not necessarily prior art to the inventive concepts disclosed and claimed herein.

A conventional drive axle assembly typically includes an axle housing from which a pair of axleshafts extend and which are drivingly connected to a pair of wheels positioned on opposite sides of the motor vehicle. Drive torque generated by the vehicle's powertrain is typically delivered to the drive axle assembly via a propshaft. The propshaft drives a hypoid gearset for transmitting the drive torque to a differential assembly rotatably supported within the axle housing of the drive axle assembly. The differential assembly is equipped with a differential gearset that is drivingly connected to the pair of axleshafts. The hypoid gearset is typically configured to include a solid pinion shaft driven by the propshaft, a pinion gear fixed to or integrally formed on the pinion shaft, and a ring gear in constant meshed engagement with the pinion gear and which is fixedly secured to a differential carrier of the differential assembly. The differential gearset is disposed within the differential carrier and includes at least one pair of differential pinions rotatably mounted on a cross-pin fixed to the differential carrier, and a pair of differential side gears which are each meshed with the differential pinions. Each differential side gear is also coupled to a corresponding one of the axleshafts such that driven rotation of the differential carrier via the hypoid gearset causes the drive torque to be transmitted to the differential gearset in a manner permitting relative rotation between the axleshafts.

At one time, a majority of the differential carriers were made as a one-piece iron casting. Iron castings have lower ductility and yield strength compared to most steels and, therefore, cast iron differential carriers typically require thick wall dimensions which detrimentally impact weight and packaging and results in reduced powertrain efficiency. To address the shortcomings of cast iron differential carriers, development was directed to two-piece differential carriers having a pair of case members made from higher strength steel using cold-forming processes. Examples of differential assemblies equipped with such two-piece differential carriers are disclosed in U.S. Pat. Nos. 4,125,026; 6,045,479; 6,176,152; 6,945,898; and 7,261,664. In each of these configurations, the two case members of the differential carrier are initially connected together with a first weld seam and the ring gear is subsequently connected to the welded two-piece differential carrier using a second weld seam and/or bolts.

As a further advancement, efforts have been directed to development of differential assemblies configured to utilize a single weld seam to interconnect the two-piece differential carrier and the ring gear. For example, U.S. Publication No. US2009/0266198 and U.S. Pat. No. 8,444,522 each disclose a differential assembly having a first case member disposed between a radial flange portion of a second case member and a radial flange portion of the ring gear, with the weld seam only interconnecting the ring gear to the radial flange portion of the second case member. As a further alternative, U.S. Publication No. US2012/0325047 discloses a differential assembly having an "integral" end cap and ring gear component that is welded to a one-piece differential carrier.

In view of the above, there remains a continuing need to develop further improvements to differential assemblies and, in particular, to two-piece differential carrier and ring gear arrangements which overcome the shortcomings of conventional single-piece and two-piece differential carrier arrangement and which provide improvements in weight savings, packaging space requirements and reduced assembly complexity.

SUMMARY OF THE INVENTION

This section provides a general summary of the disclosure and is not a comprehensive listing of its full scope or all of its aspects and features. The description and specific examples disclosed in this summary are not intended to limit the scope of the inventive concepts disclosed herein.

It is an aspect of the present disclosure to provide a differential assembly of the type adapted for use in motor vehicle driveline applications and which is equipped with a two-piece differential carrier and a ring gear configured such that differential case members are interconnected to the ring gear along a pair of weldment junctions.

In accordance with this and other aspects, objectives and features of the present disclosure, a differential assembly is provided for use in motor vehicles to transmit drive torque from a powertrain to a pair of ground-engaging wheels. To this end, the differential assembly of the present disclosure is configured to include a two-piece differential carrier, a differential gearset operably disposed in a gearset chamber formed in the differential carrier, and a ring gear engaged with the differential carrier via a mechanical interlocking arrangement and which is subsequently welded to the differential carrier along two distinct weldment junctions established by the mechanical interlocking arrangement.

In accordance with one non-limiting embodiment, the differential assembly of the present disclosure includes a two-piece differential carrier having first and second case members which together define the internal gearset chamber and an external carrier groove. The carrier groove is defined by a first groove section formed in the first case member and a second groove section formed in the second case member. The ring gear includes a hub segment configured to surround the two-piece differential carrier and a geared segment extending outwardly from the hub segment. The hub segment of the ring gear is formed to include an internal locator flange configured to be located and retained in the first and second groove segments of the carrier groove upon assembly of the two case members together. The retention of the locator flange within the carrier groove defines the mechanical interlocking arrangement between the ring gear and the first and second case members. With the locator flange retained within carrier groove, first and second weldment junctions are thereafter established between the hub segment of the ring gear and the first and second case members. The first weldment junction is established between a first ring gear weldment surface on the hub segment of the ring gear and a first case weldment surface on the first case member. The second weldment junction is established between a second ring gear weldment surface on the hub segment of the ring gear and a second case weldment surface on the second case member. A first weld seam is formed in the first weldment junction and a second weld seam is formed in the second weldment junction via a welding operation.

In accordance with an additional feature of the present disclosure, a clamping force is applied and maintained on the mechanically interlocked first and second case members during the welding operation to minimize weld-related distortion.

In accordance with yet another feature of the present disclosure, the two case members are formed from high strength steel and are identically configured to include a first large diameter cylindrical segment, a second smaller diameter cylindrical segment, and a semi-spherical segment interconnecting the first and second cylindrical segments. The groove segments are formed or machined into an outer surface of the first large diameter cylindrical segment of the case members and are alignable to define the carrier groove.

In accordance with another non-limiting embodiment, the differential assembly of the present disclosure includes a two-piece differential carrier having first and second case members which together define an internal gearset chamber and which are mechanically interconnected via a locator flange and groove arrangement. One of the first and second case members is configured to include an axially-extending locator flange sized and arranged to be disposed in an annular carrier groove formed in the other of the first and second case members. The ring gear includes a hub segment configured to surround the two-piece differential carrier and a geared rim segment extending from the hub segment. The hub segment of the ring gear includes a pilot groove configured to locate and abut a pilot flange formed on one of the first and second case members. With the pilot flange disposed within the pilot groove, first and second weldment junctions are established between the hub segment of the ring gear and the first and second case members. The first weldment junction is defined by a first weld groove established between a first ring gear weldment surface on the ring gear and a first case weldment surface on the first case member. The second weldment junction is defined by a second weld groove established between a second ring gear weldment surface on the ring gear and a second case weldment surface on the second case member. A first weld seam is formed within the first weldment junction and a second weld seam is formed within the second weldment junction via a welding operation.

In accordance with yet another feature of the present disclosure, the two case members are formed from high strength steel and each is configured to include a first large diameter cylindrical segment, a second small diameter cylindrical segment, and a semi-spherical segment interconnecting the first and second cylindrical segments. An end surface of the first cylindrical segment associated with the first case member includes an axially-extending cylindrical locator flange configured to be located and retained within an annular carrier groove formed in a mating end surface of the first cylindrical segment associated with the second case member. A radial pilot flange is formed or machined into an outer diameter surface of one of the first and second case members to establish a stop surface configured to locate and abutting engage a pilot surface associated with the pilot groove formed in the ring gear hub segment.

In accordance with another feature of the present disclosure, the two-piece differential carrier includes a pair of alignable crosspin mounting apertures formed in the first cylindrical segments of the first and second case members. The mounting apertures are each configured to include a pair of laterally-spaced side surfaces interconnected by a large radius arcuate end surface. Stress-relieving edges are provided at the interface of each side surface and the arcuate end surface.

Further areas of applicability will become apparent from the description provided herein. The description and specific examples of embodiments listed in this summary are only intended for purposes of illustration and are not interpreted to limit the scope of the inventive concepts associated with the present disclosure.

DRAWINGS

The drawings described herein are for illustrative purposes only of selected embodiments and are not intended to limit the scope of the present disclosure. Accordingly, the inventive concepts associated with the present disclosure will be more readily understood by reference to the following description in combination with the accompanying drawings, where:

FIG. 1 schematically illustrates a drivetrain of a four-wheel drive vehicle having at least one axle assembly equipped with a differential assembly that is constructed and operable in accordance with the teachings of the present disclosure;

FIG. 2 is a schematic view of a differential assembly adapted for use in the axle assemblies of the four-wheel drive vehicle shown in FIG. 1 and which embodies the teachings of the present disclosure;

Figure 3:
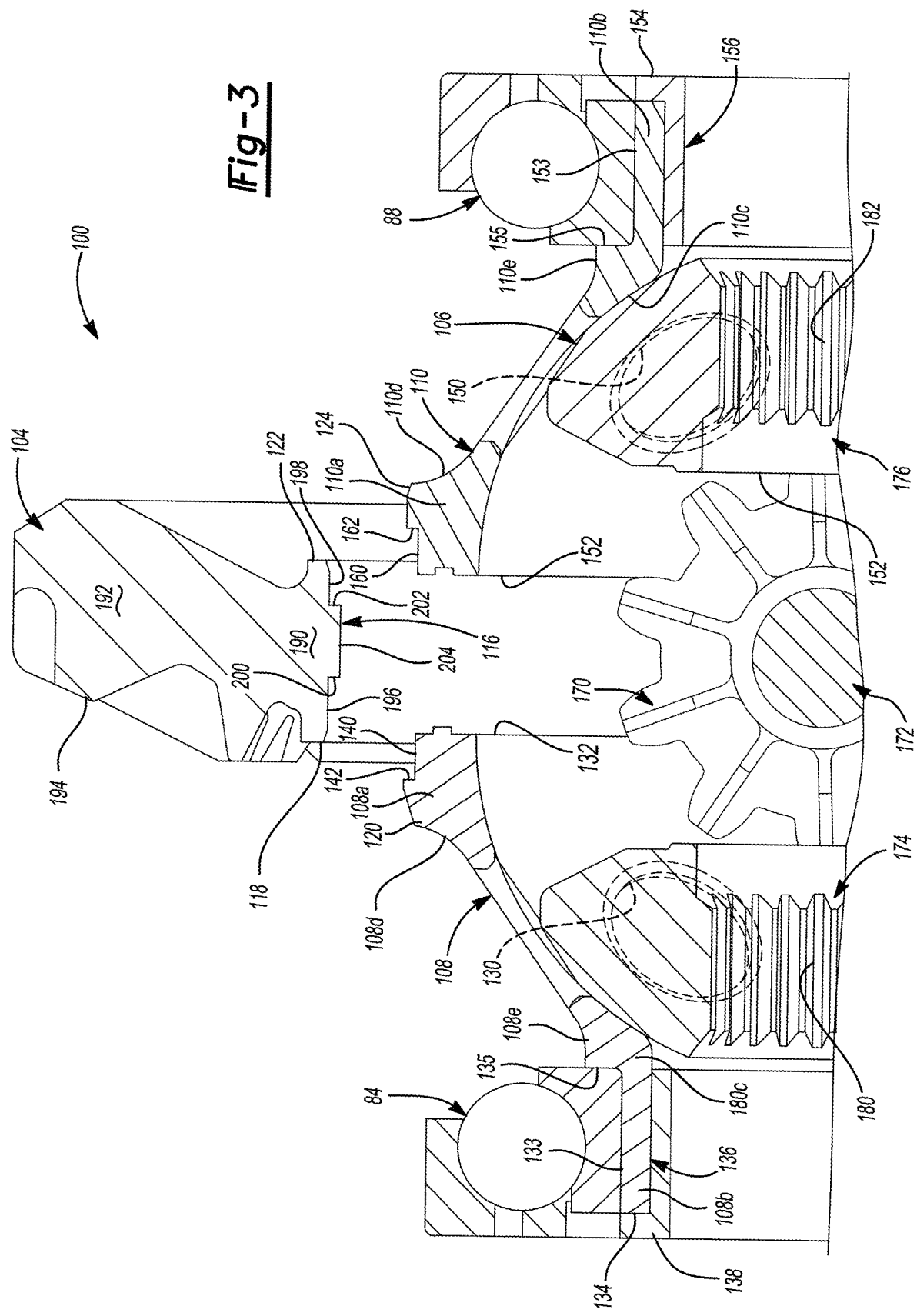
FIG. 3 is an exploded isometric view of a differential assembly constructed in accordance with a first embodiment of the present disclosure and illustrating a two-piece differential carrier and ring gear arrangement.

Common reference numerals are used through the several figures to identify corresponding components.

DESCRIPTION OF THE EXEMPLARY EMBODIMENTS

Example embodiments will now be described more fully with reference to the accompanying drawings. Each of the example embodiments is generally directed to a differential assembly of the type used in motor vehicle driveline applications. The example embodiments are only provided so that this disclosure will be thorough, and will fully convey the intended scope to those who are skilled in the art. Numerous specific details are set forth such as examples of specific components, devices, and methods, to provide a thorough understanding of embodiments of the present disclosure. It will be apparent to those skilled in the art, however, that specific details need not be employed, that example embodiments may be embodied in many different forms, and that neither should be construed to limit the scope of the disclosure. In some example embodiments, well-known processes, well-known device structures, and well-known technologies are not described in detail.

The present disclosure is generally directed to one or more embodiments of a differential assembly of the type well suited for use in power transfer devices such as, for example, drive axles and transaxles, to transmit drive torque from a powertrain of a motor vehicle to a pair of ground-engaging wheels. More specifically, the differential assemblies of the present disclosure include a two-piece differential carrier, a differential gearset operably disposed in a gearset chamber established between the first and second case members of the two-piece differential carrier, and a ring gear configured to be fixedly secured to each of the first and second case members. The two-piece differential carrier is configured such that the first and second case members are adapted to be mechanically interconnected together and/or with the ring gear via an annular interlocking arrangement and define a pair of differential case weldment surfaces. In one embodiment, the ring gear includes an annular flange configured to engage and be retained in an annular groove formed in the first and second case members and define a pair of ring gear weldment surfaces. The ring gear weldment surfaces are adapted to be aligned with the pair of differential case weldment surfaces. In another embodiment, the first and second case members are interconnected via a first locator flange and groove type piloting arrangement and the ring gear is configured to engage the interconnected two-piece differential carrier via a second locator flange and groove type piloting arrangement to define a pair of ring gear weldment surfaces. The ring gear weldment surfaces are adapted to be aligned with a pair of case weldment surfaces. With both embodiments, the ring gear is welded to the two-piece differential carrier by providing weld seams along first and second weldment junctions established by the aligned pairs of differential case and ring gear weldment surfaces.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order or sequence of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With particular reference to FIG. 1 of the drawings, a drivetrain 10 for a four-wheel (4WD) drive motor vehicle is shown. Drivetrain 10 includes a primary driveline 12, a secondary driveline 14, and a powertrain 16 for generating and delivering rotary power, namely drive torque, to the drivelines 12, 14. In the particular non-limiting arrangement shown, primary driveline 12 is the rear driveline while secondary driveline 14 is the front driveline. Powertrain 16 includes an engine 18, a transmission 20 and a transfer case 22. Rear driveline 12 includes a pair of rear wheels 24 and a rear axle assembly 28 having a rear differential assembly 30 and a pair of rear axleshafts 26 drivingly interconnecting rear differential assembly 30 to rear wheels 24. Rear driveline 12 also includes a rear propshaft 32 having a first end drivingly connected to rear differential assembly 30 via a rear hypoid gearset (not shown) and a second end drivingly connected to a rear output shaft or mainshaft 34 of transfer case 22. Mainshaft 34 of transfer case 22 is configured to receive drive torque from powertrain 16 via a transmission output shaft (not shown).

Front driveline 14 includes a pair of front wheels 36 connected to front axleshafts 38 of a front axle assembly 40 which has a front differential assembly 42 drivingly connected to front axleshafts 38. Front driveline 14 also includes a front propshaft 44 having a first end drivingly connected to front differential assembly 42 via a front hypoid gearset (not shown) and a second end drivingly connected to a front output shaft 46 of transfer case 22. Front axle assembly 40 is of the "disconnectable" type and is shown to include a disconnect clutch 48 operably installed between shaft segments 38A, 38B of one of front axleshafts 38.

With continued reference to FIG. 1 of the drawings, drivetrain 10 is further shown, in this non-limiting embodiment, to include an electronically-controlled power transfer system configured to permit a vehicle operator to select between a two-wheel drive (2WD) mode, a part-time or "locked" four-wheel drive (LOCK-4WD) mode, and an adaptive or "on-demand" four-wheel drive (AUTO-4WD) mode. In this regard, transfer case 22 is equipped with a transfer clutch 50 that can be selectively actuated for transferring drive torque from mainshaft 34 to front output shaft 46 for establishing the LOCK-4WD and AUTO-4WD modes of operation. The power transfer system further includes a power-operated clutch actuator 52 for controlling actuation of transfer clutch 50, a power-operated disconnect actuator 54 for controlling actuation of disconnect clutch 48, a plurality of vehicle sensors 56 for detecting certain dynamic and operational characteristics of the motor vehicle, a mode selector 58 for permitting the vehicle operator to select one of the available drive modes, and a controller unit 60 for controlling coordinated actuation of actuators 52, 54 in response to input signals from vehicle sensors 56 and a mode signal from mode selector 58.

To establish the 2WD mode, clutch actuator 52 is controlled to shift transfer clutch 50 into a "released" mode while disconnect actuator 54 is controlled to shift disconnect clutch 48 into a "disconnected" mode. With transfer clutch 50 in its release mode, no drive torque is transmitted through transfer clutch 50 to front output shaft 46 such that all drive torque is delivered from powertrain 16 to rear wheels 24 via rear driveline 12. With disconnect clutch 48 in its disconnected mode, axleshaft segments 38A, 38B are disconnected such that rotation of front wheels 36 during motive operation of the vehicle does not cause front propshaft 44 and front output shaft 46 of transfer case 22 to be back-driven.

To establish the lock-4WD mode, disconnect actuator 54 is controlled to shift disconnect clutch 48 into a "connected" mode and clutch actuator 52 is controlled to shift transfer clutch 50 into a "fully-engaged" mode. With transfer clutch 50 operating in its fully-engaged mode, mainshaft 34 is, in effect, drivingly coupled to front output shaft 46 such that the drive torque is equally distributed therebetween. With disconnect clutch 48 in its connected mode, shaft segments 38A, 38B are drivingly connected such that drive torque delivered to front output shaft 46 is transferred via front driveline 14 to front wheels 36.

To establish the AUTO-4WD mode, disconnect clutch 48 is shifted into or maintained in its connected mode and clutch actuator 52 operates to adaptively regulate the drive torque distribution ratio between mainshaft 34 and front output shaft 46 by varying operation of transfer clutch 50 between its released and fully-engaged modes. The desired distribution ratio is based on and determined by control logic associated with controller unit 60 and which is configured to determine a desired amount of the total drive torque to be transferred to front output shaft 46 based on the operating characteristic and/or road conditions detected by sensors 56.

FIG. 2 illustrates a schematic version of front differential assembly 42 rotatably installed in a differential housing 70 associated with front axle assembly 40. Differential assembly 42 generally includes a two-piece differential carrier 72, a ring gear 74, and a differential gearset 76. Two-piece differential carrier 72 includes a first case member 78 and a second case member 80 which, when assembled, define an internal gearset chamber 82. As will be detailed, differential gearset 76 is adapted to be installed within gearset chamber 82 prior to ring gear 74 being secured to differential carrier 72. A first bearing unit 84 is provided for rotatably supporting first case member 78 within a differential cavity 86 formed in differential housing 70 while a second bearing unit 88 is provided for rotatably supporting second case member 80 within differential cavity 86. Differential gearset 76 is shown to include a pair of differential pinions 90A, 90B rotatably mounted on a crosspin 92 fixedly secured to differential carrier 72, a first differential side gear 94 in constant mesh with pinions 90A, 90B, and a second side gear 96 also in constant mesh with differential pinions 90A, 90B. Axleshafts 38 are each connected directly to a corresponding differential side gear 94, 96 or, in the alternative, via an intermediate stub shaft 38'. It will be understood that differential assembly 42, as shown in FIG. 2, is merely intended to disclose the basic components of a differential assembly capable of use in motor vehicle applications. As will be detailed, differential assembly 42 is configured to include a new and improved arrangement for aligning and rigidly securing ring gear 74 to first case member 78 and to second case member 80 of two-piece differential carrier 72. A method of assembling and manufacturing differential assembly 42 will also be detailed.

With particular reference now to FIGS. 3 through 6 of the drawings, a first non-limiting embodiment of a differential assembly 100 constructed in accordance with the present disclosure is generally shown to include a two-piece differential carrier 102, a ring gear 104, and a differential gearset 106. Two-piece differential carrier 102 includes a first case member 108 and a second case member 110 which, when assembled, define an internal gearset chamber 112 within which differential gearset 106 is operably installed. As will be detailed, first case member 108 and second case member 110 are configured, when assembled, to define an annular carrier groove 114 sized to accept and retain an annular locator flange 116 extending from ring gear 104. With locator flange 116 disposed within carrier groove 114, a first ring gear weldment surface 118 on ring gear 104 is aligned with a first case weldment surface 120 on first case member 108 to establish a first weldment junction "WJ1" therebetween, while a second ring gear weldment surface 122 on ring gear 104 is aligned with a second case weldment surface 124 on second case member 110 to establish a second weldment junction "WJ2" therebetween. As will further be detailed, an assembly and welding method for differential assembly 100 will be described.

First case member 108 is configured, in this non-limiting embodiment, to include a larger diameter first cylindrical segment 108a, a smaller diameter second cylindrical segment 108b, a semi-spherical body segment 108c, a first transition segment 108d interconnecting first cylindrical segment 108a and semi-spherical body segment 108c, and a second transition segment 108e interconnecting second cylindrical segment 108b and semi-spherical body segment 108c. Preferably, first case member 108 is a stamped component formed from high strength steel (i.e., ultra high strength boron steel). A plurality of circular apertures 130 are formed in semi-spherical body segment 108c to reduce mass. A first end surface 132 is associated with first cylindrical segment 108a while a second end surface 134 is associated with second cylindrical segment 108b. An inner race of first bearing assembly 84 is shown pressed onto an outer diameter surface 133 of second cylindrical segment 108b and into abutment with a stop shoulder surface 135 associated with second transition segment 108e. A first journal sleeve 136 is shown pressed onto an inner diameter surface of second cylindrical segment 108b with its radial end flange 138 engaging second end surface 134. Finally, a first groove segment associated with carrier groove 114 is formed (i.e. machined) into an outer diameter surface of first cylindrical segment 108a and defines a first groove surface 140 and a first stop surface 142.

Second case member 110 is configured, in this non-limiting embodiment, to be generally identical in structure and function to that of first case member 108. Specifically, second case member 110 includes a larger diameter first cylindrical segment 110a, a smaller diameter second cylindrical segment 110b, a semi-spherical body segment 110c, a first transition segment 110d interconnecting first cylindrical segment 110a and semi-spherical body segment 110c, and a second transition segment 110e interconnecting second cylindrical segment 110b and semi-spherical body segment 110c. Preferably, second case segment is also a stamped component formed from a high strength steel. A plurality of circular apertures 150 are formed in semi-spherical segment 110c to reduce mass. A first end surface 152 is associated with first cylindrical segment 110a while a second end surface 154 is associated with second cylindrical segment 110b. An inner race of second bearing assembly 88 is shown pressed onto an outer diameter surface 153 of second cylindrical segment 110b and into abutment with a stop shoulder surface 155 associated with second transition segment 110c. A second journal sleeve 156 is shown pressed onto an inner diameter surface of second cylindrical segment 110b with its radial end flange 158 engaging second end surface 154. In addition, a second groove segment of carrier groove 114 is formed (i.e. machined) into an outer diameter surface of first cylindrical segment 110a and defines a second groove surface 160 and a second stop surface 162.

Figure 4:
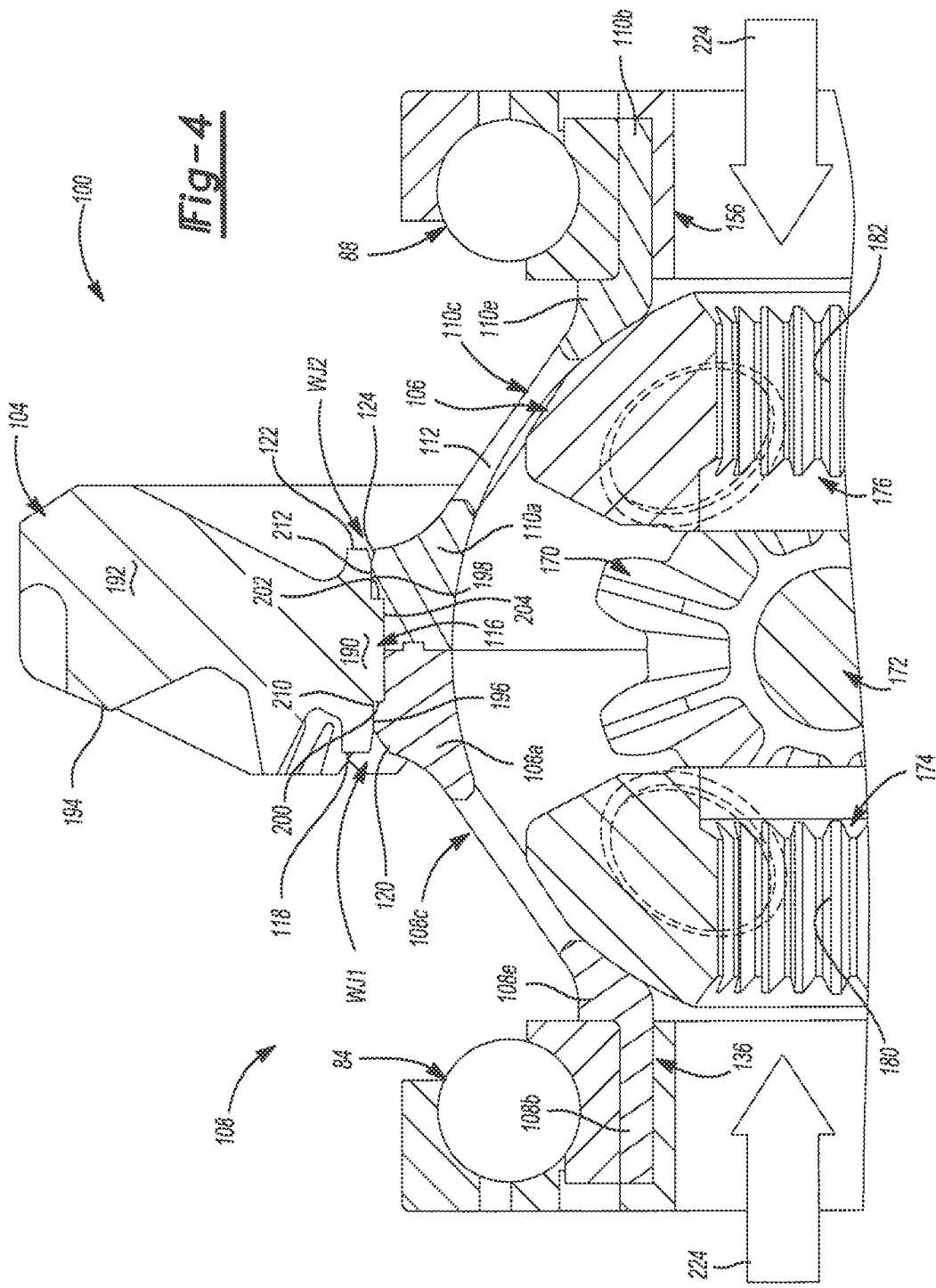
FIG. 4 is an assembled isometric view of the differential assembly shown in FIG. 3.
Figure 5:
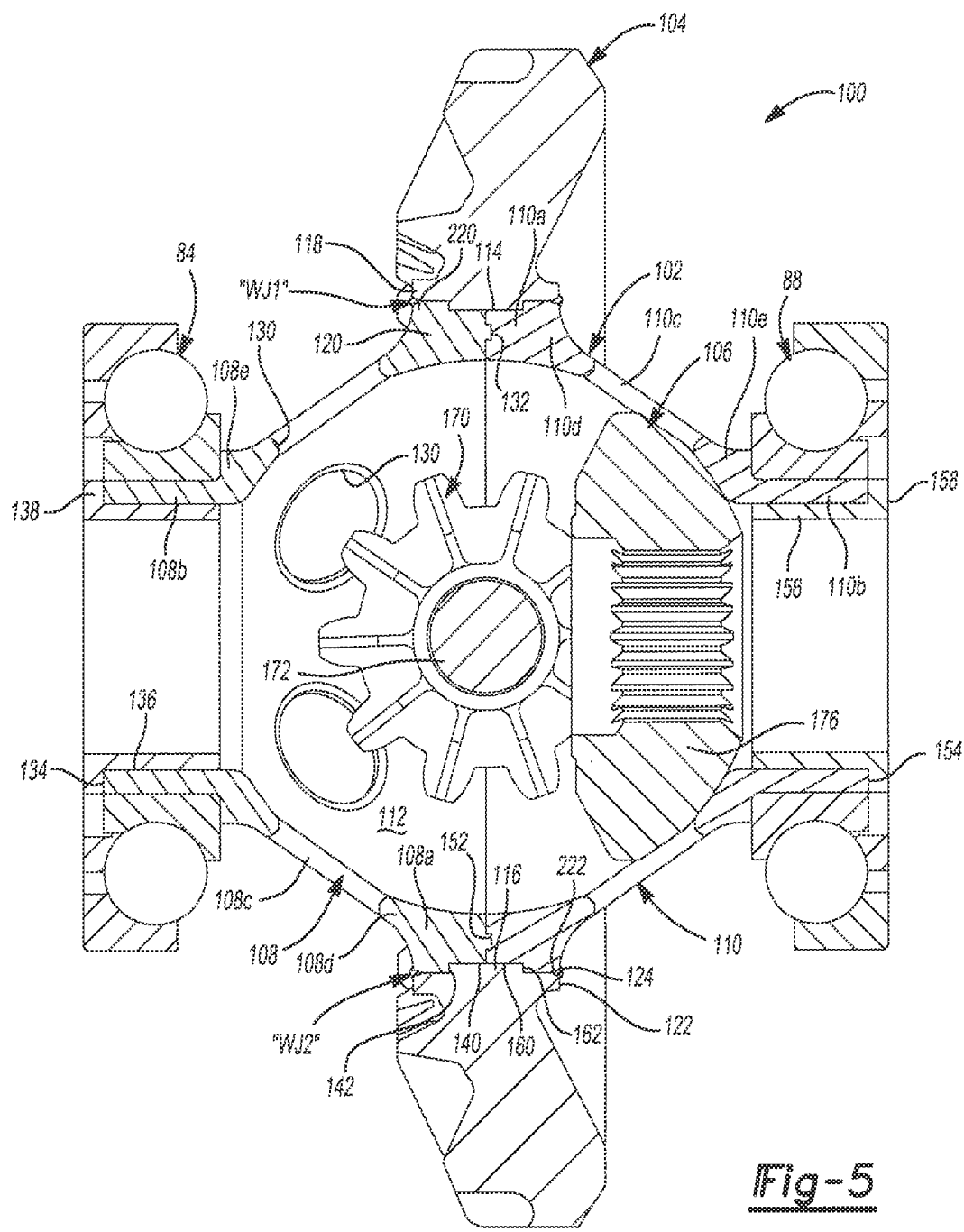
FIG. 5 is a sectional view of the differential assembly shown in FIGS. 3 and 4.
Figure 6:
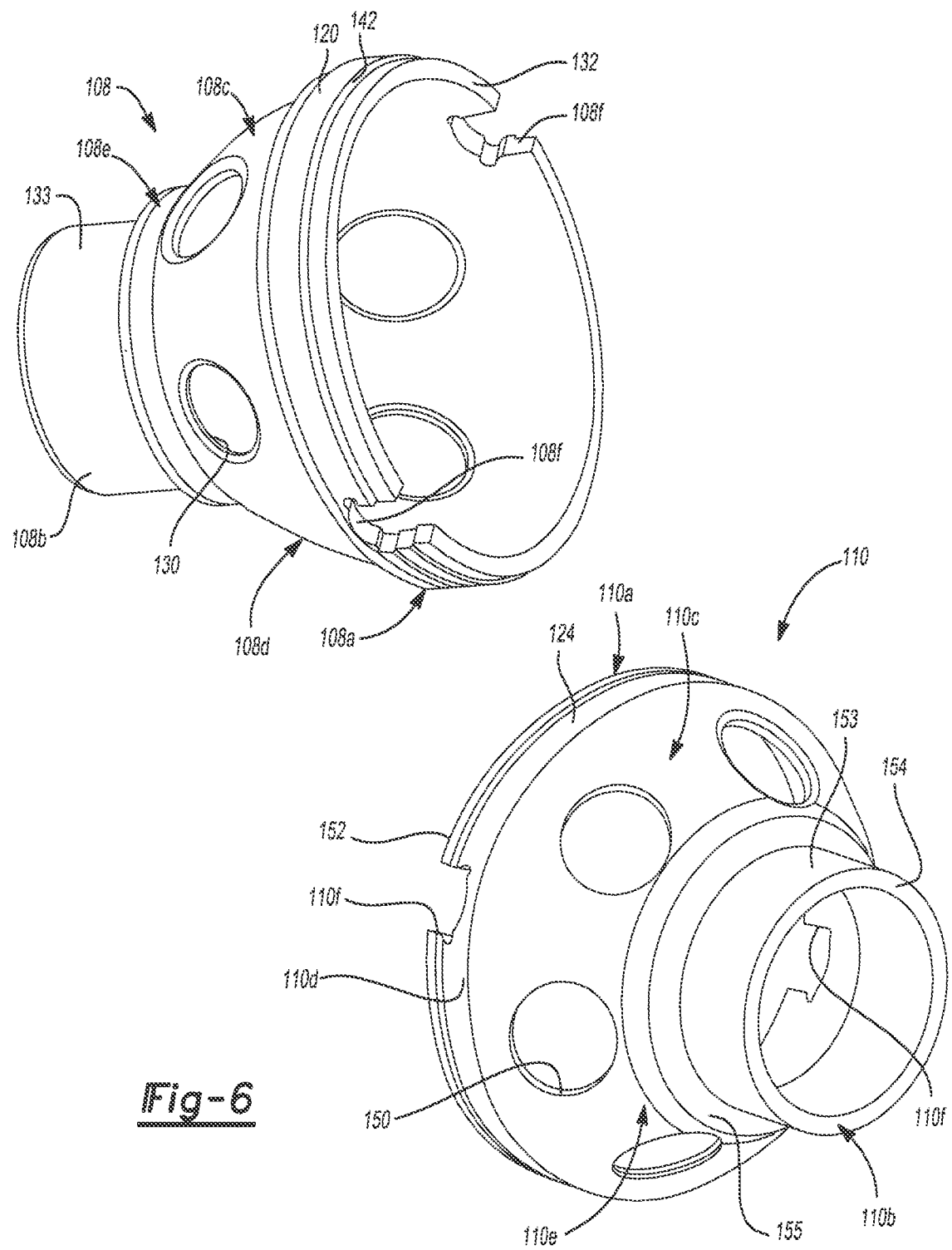
FIG. 6 is an exploded isometric view illustrating first and second case members associated with the two-piece differential carrier of the present disclosure.

FIGS. 3 through 5 illustrate the components of differential gearset 106 that are disposed in gearset chamber 112 of differential carrier 102. Specifically, one of a pair of differential pinions 170 is shown rotatably mounted on a cross pin 172 that is fixedly secured to differential carrier 102. Differential gearset 106 also includes a first differential side gear 174 configured to be in constant mesh with both differential pinions 170, and a second differential side gear 176 also configured to be in constant mesh with both differential pinions 170. First differential side gear 174 includes internal spline teeth 180 configured to mate with external spline teeth formed on a first one of axleshaft 38, 38' while second differential side gear 176 includes internal spline teeth 182 configured to mate with external spline teeth formed on a second of axleshafts 38, 38'. While not specifically limited to the arrangement shown, differential side gears 174, 176 are configured with a semi-spherical outer peripheral surface arranged to align with similarly configured semi-spherical inner peripheral surfaces of respective first and second case members 108, 110. Thrust washers, while not shown, could be installed between differential side gears 174, 176 and case members 108, 110 in alternative arrangements. Likewise, differential pinions 170 are also configured with a semi-spherical outer peripheral surface arranged to align with similarly configured inner peripheral surfaces on first and second case members 108, 110.

Ring gear 104 is shown to generally include an axially-extending hub segment 190 and a radially-extending gear segment 192 having gear teeth 194 configured to mesh with a pinion gear of a pinion shaft driven by one of the propshafts. Hub segment 190 of ring gear 104 includes a first face surface defining first ring gear weldment surface 118 and a second face surface defining second ring gear weldment surface 122. Locator flange 116 is shown to extend radially inwardly from an inner diameter surface of hub segment 190 which defines a first ring gear mount surface 196 and a second ring gear mount surface 198 on opposite sides of locator flange 116. First ring gear mount surface 196 extends between first ring gear weldment surface 118 and a first ring gear locator surface 200 associated with locator flange 116. Similarly, second ring gear mount surface 198 extends between second ring gear weldment surface 122 and a second ring gear locator surface 202 associated with locator flange 116. Locator flange 116 also includes a flange end surface 204 which extends between first and second ring gear locator surfaces 200, 202.

FIG. 3 is an explode or "pre-assembly" isometric illustration of differential assembly 100 showing installation of journal sleeves 136, 156 and bearings 84, 88 onto cylindrical segments 180b, 110b of the two case members prior to assembly of differential gearset 106 and ring gear 104 to differential carrier 102. Alternatively, these components can be pressed into/onto the case members 108, 110 of differential carrier 102 subsequent to assembly of differential gearset 106 and ring gear 104. To assembly differential assembly 100, opposite ends of crosspin 172 are secured in aligned pairs of non-circular apertures 108f, 110f formed in case members 108, 110 using any suitable means so as to non-rotatably fixedly secure crosspin 172 to differential carrier 102. If a single crosspin 172 traverses the entire length of gearset chamber 112, differential pinions 170 are rotatably mounted thereon prior to attachment of crosspin 172 in apertures 108f, 110f. Side gears 174, 176 are then placed within case members 108, 110 so as to mesh with differential pinions 170. Ring gear 104 is then positioned so as to align locator flange 116 with the first and second groove sections machined into corresponding ends 108a, 110a of case members 108, 110. Case members 108 and 110 are then moved toward each other until locator flange 116 is disposed and mechanically retained within annular carrier groove 114, as is best shown in FIGS. 4 and 5.

In the "assembled" arrangement shown in FIG. 4, end surface 132 of first case member 108 engages or is in close proximity to end surface 152 of second case member 110. This surface mating relationship establishes a mechanical interlocking arrangement with locator flange 116 disposed in carrier groove 114. Specifically, flange end surface 204 of locator flange 116 engages first groove surface 140 of first case member 108 and second groove surface 160 of second case member 110. Additionally, first ring gear locator surface 200 on locator flange 116 engages first stop surface 142 of first carrier member 108 while second ring gear locator surface 202 on locator flange 116 engages second stop surface 162 of second carrier member 110. This "capture" of locator flange 116 in carrier groove 114 functions to centrally locate ring gear 104 relative to two-piece differential carrier 102 and cause first ring gear mount surface 196 of hub segment 190 to engage a first carrier mount surface 210 formed on end segment 108a of first carrier member 108, and also cause second ring gear mount surface 198 of hub segment 190 to engage a second carrier mount surface 212 formed on end segment 110a of second carrier member 110.

As best seen from FIG. 4, the edge portions of first carrier mount surface 210 and first ring gear mount surface 196 are tapered relative to first ring gear weldment surface 118 and first case weldment surface 120 to establish a first continuous weld groove which defines the first weldment junction (WJ1) between first case member 108 and ring gear 104. Likewise, a similar tapered relationship between the second mount surfaces 210 and 198 and the second weldment surfaces 122 and 124 establishes a second continuous weld groove which defines the second weldment junction (WJ2) between second case member 110 and ring gear 104. Following assembly, a welding operation is performed to establish a first weld seam 220 within the first weld groove along first weldment junction (WJ1) and a second weld seam 222 within the second weld groove along second weldment junction (WJ2), as best seen in FIG. 5. Arrows 224 are shown in FIG. 4 to indicate the direction in which axially directed forces (i.e. clamping forces) are applied to the ends of two-piece differential carrier 102 before and during the welding operation. This "clamping" of carrier 102 and ring gear 104 during the welding process provides reduced run-out from weld-related deflection. Thus, machining of the pilot diameters and the stop surfaces into the groove sections of each case member 108, 110 allows positive positioning of the differential carrier 102 for controlling the effective diameter of differential assembly 100. As noted, the two stamped high strength case members 108, 110 can be pressed simultaneously toward ring gear 104 until locator flange 116 engages carrier groove 114. This pressing force can be maintained on the assembled components during the welding operation to reduce weld distortion between differential carrier 102 and ring gear 104. Weld seams 220 and 222 are preferably continuous so as to entirely surround each of the weld junctions. However, a series of intermittent weld seams can be placed around the weld junctions as an alternative to a continuous weld seam. While not limited thereto, the weld seams are preferably formed via a laser welding operation or an electron beam welding operation. While the mechanical interlocking arrangement between differential carrier 102 and ring gear 104 is illustrated in FIGS. 3-6 as utilizing a continuous locator flange 116 retained in a continuous carrier groove 114, it is contemplated that a "non-continuous" version thereof can likewise be employed. Such a non-continuous configuration would result in a mechanical interlocking arrangement between differential carrier 102 and ring gear 104 having a series of locator flange lugs retained in corresponding carrier groove sections.

Figure 7:
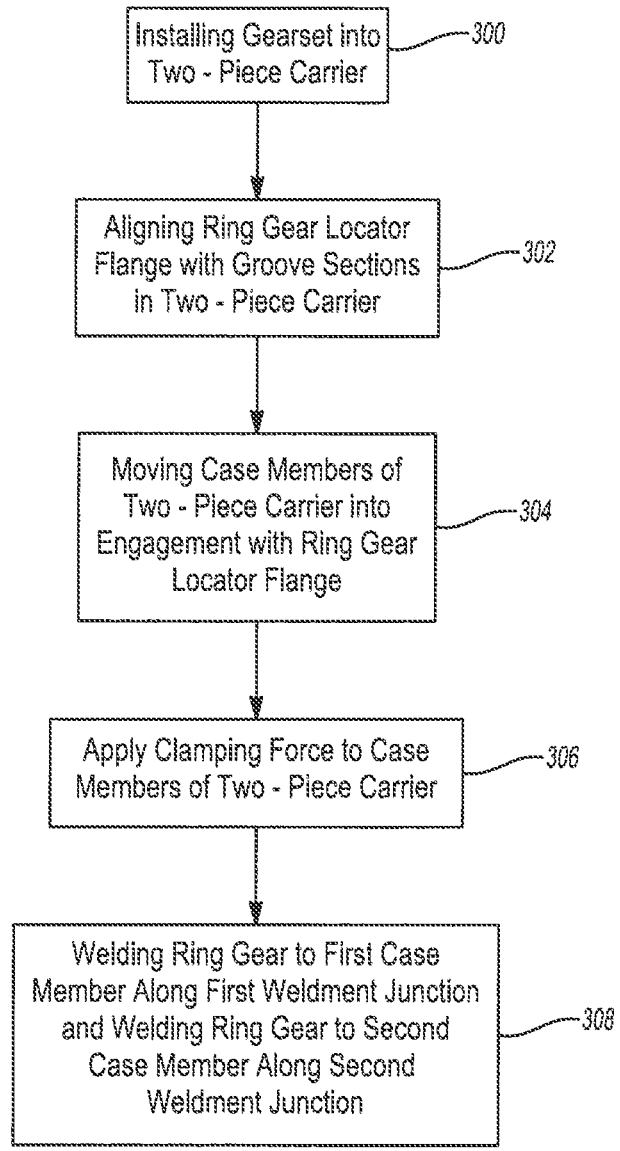
FIG. 7 is a diagram illustrating a method of assembling and welding the differential case members and the ring gear to manufacture the differential assembly shown in FIGS. 3 through 6.

FIG. 7 diagrammatically illustrates a series of operations or "steps" associated with a method for assembling differential assembly 100. The non-limiting method includes a first step 300 for installing the components of differential gearset 106 into corresponding chamber portions of first and second case members 108, 110 of two-piece differential carrier 102. A second step 302 includes the operation of aligning locator flange 116 of ring gear 104 relative to the groove sections of annular carrier groove 114 associated with first and second case members 108, 110. A third step 304 includes axially moving the first and second case members toward each other (or one case member toward the other) so as to mechanically interlock ring gear 104 with respect to two-piece differential carrier 102. Thereafter, a fourth step 306 is directed to applying an axially-directed clamping force on both case members (or to one case member relative to an axially retained other case member). Finally, a fifth step 308 indicates performance of the welding operation for welding ring gear 104 to first case member 108 along the first weldment junction and for welding ring gear 104 to second case member 110 along the second weldment junction.

Recognizing that two-piece differential carrier 102 has been disclosed to include first and second case members formed symmetrically via a pressing operation from high strength steel, those skilled in the art will appreciate alternative case fabrication processes are intended to be within the scope of this disclosure. For example, forged first and second case members are contemplated and having a heat treatment selected to achieve a desired martensitic structure. The martensitic structure of the two-piece differential carrier would be capable of being welded to the ring gear along the first and second weldment junctions.

It should be appreciated that any type of welding method could be utilized along each of the two weldment junctions such as, but not limited to, laser, electronic beam, MIG (Metal in Gas) and TIG (Tungsten Inert Gas) welding. Other methods of fixedly connecting components could be used, e.g., brazing, soldering or high-strength adhesives. Finally, it should also be pointed out that the specific configurations provided for the first and second case members of the differential carrier disclosed herein are merely intended to be examples and any alternative configuration providing a mechanical interconnection and pairs of weldment surfaces alignable along weldment junctions are within the scope of the present disclosure.

Figure 8:
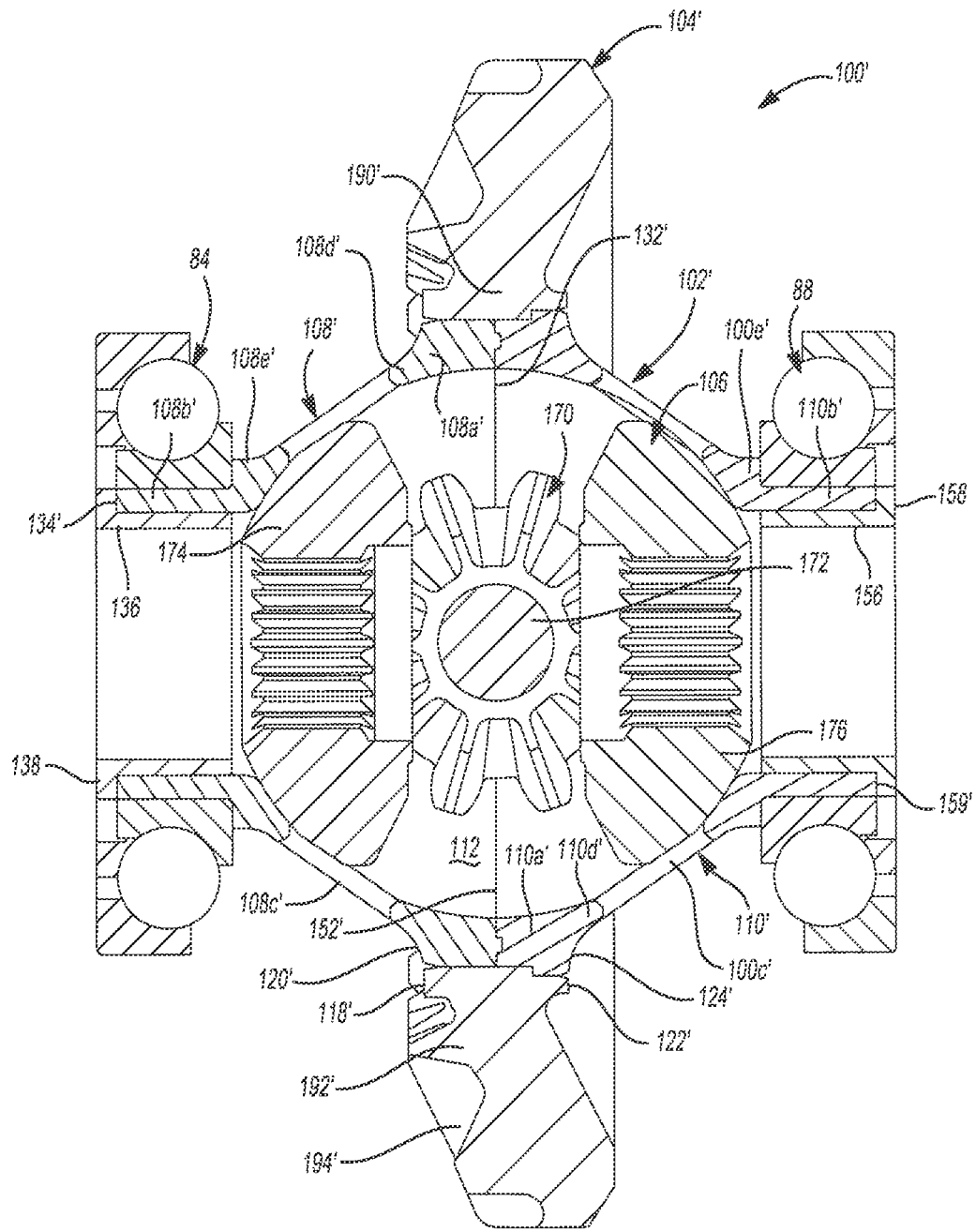
FIG. 8 is a sectional view of a differential assembly adapted for use in the axle assemblies of the four-wheel drive vehicle shown in FIG. 1 and which is constructed in accordance with an alternative embodiment of the present disclosure.
Figure 9:
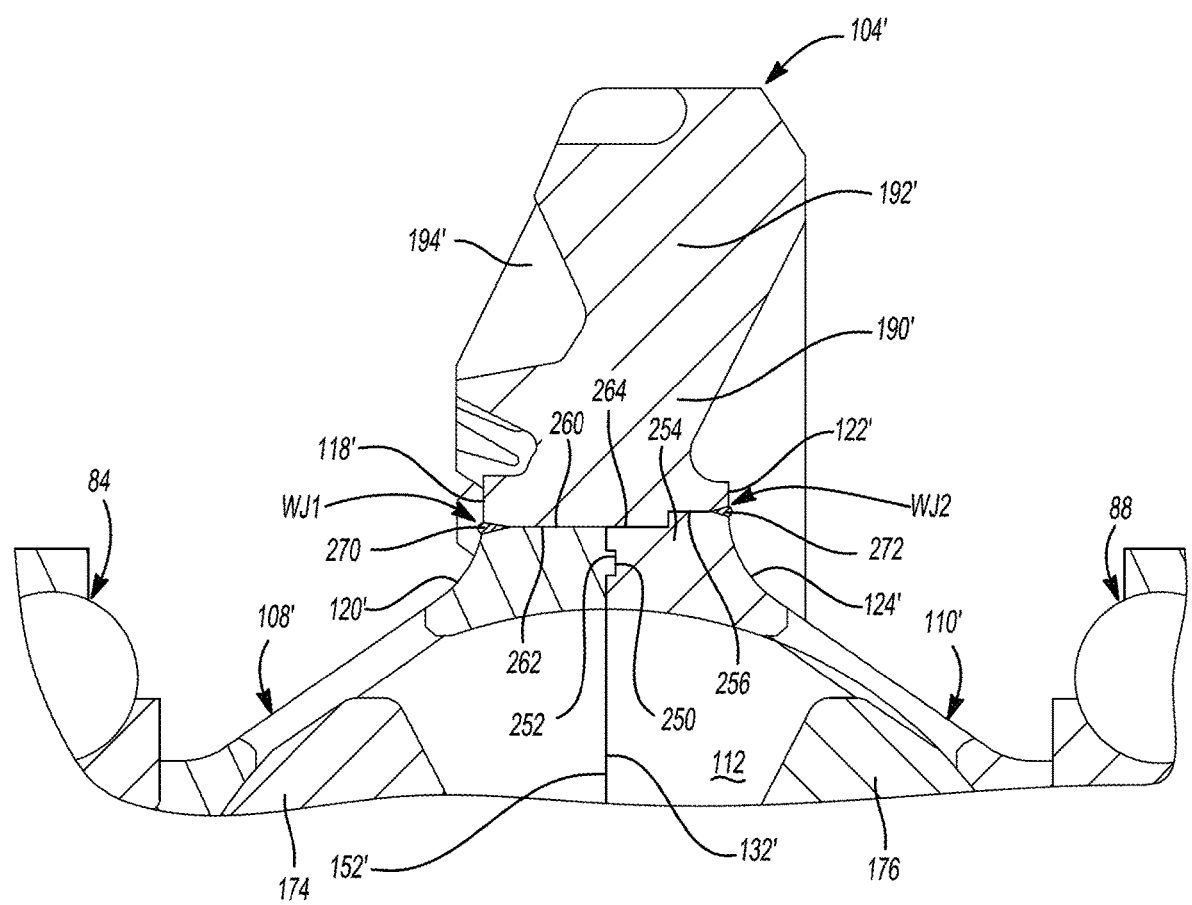
FIG. 9 is an enlarged partial view of the differential assembly shown in FIG. 8 and which better illustrates a piloted two-piece differential carrier and a welded ring gear arrangement.

Referring now to FIGS. 8 and 9 of the drawings, an alternative embodiment of a differential assembly is generally identified by reference numeral 100'. Generally speaking, differential assembly 100' is substantially similar to differential assembly 100 shown in FIGS. 3-6 with the exception that an alternative mechanical interlocking arrangement is disclosed. Accordingly, common reference numerals are used to designate identical (or virtually identical) components and/or features while primed reference numerals are used to identify those components and/or features of differential assembly 100' that have been revised to be structurally and/or functionally different in comparison to the components of differential assembly 100. Thus, differential assembly 100' is a second non-limiting embodiment constructed in accordance with the present disclosure.

Differential assembly 100' is shown to generally include a two-piece differential carrier 102', a ring gear 104', and a differential gearset 106. Two piece differential carrier 102' includes a first case member 108' and a second case member 110' which, when assembled, define internal gearset chamber 112 within which differential gearset 106 is operably installed. As will be detailed, first case member 108' is configured to define an axially-extending cylindrical pilot or locator flange 250 which is arranged and sized to be accepted and retained within an annular carrier groove 252 formed in second case member 110'. With locator flange 250 disposed within carrier groove 252, a first ring gear weldment surface 118' formed on ring gear 104' is alignable with a first case weldment surface 120' formed on first case member 108' to establish a first weldment junction "WJ1" therebetween. Similarly, a second ring gear weldment surface 122' formed on ring gear 104' is alignable with a second case member weldment surface 124' formed on second case member 110' to establish a second weldment junction "WJ2" therebetween. As will also be noted, second case member 110' is configured to include a radially-extending pilot flange 254 that is alignable and engageable with a radial pilot groove 256 formed in hub segment 190' of ring gear 104'.

As best seen from FIG. 9, locator flange 250 extends axially from first end surface 132' of first case member 108' associated with first cylindrical segment 108a' thereof. Similarly, carrier groove 252 is formed in first end surface 152' on first cylindrical segment 110a' of second case member 110'. First cylindrical segment 108a' of first case member 108' includes an outer diameter mounting surface 260 configured to be aligned with an inner diameter mounting surface 262 formed on hub segment 190' upon assembly of two-piece differential carrier 102' and installation of ring gear 104' thereon. Likewise, first cylindrical segment 110a' of second case member 110' includes an outer diameter mounting surface 264 configured to also be aligned with inner diameter mounting surface 262 of ring gear hub segment 190'. Pilot groove 256 is machined into outer mounting surface 264 of second case member 110' and provides a stepped shoulder or stop surface against which a face surface of pilot flange 254 abuttingly engages. Additionally, an outer peripheral edge surface of pilot flange 254 is configured to align with a cylindrical side surface associated with pilot groove 256.

With continued reference to FIG. 9, outer mounting surface 260 on first cylindrical segment 108a' is tapered in proximity to first case weldment surface 120' while inner mounting surface 262 of ring gear hub segment 190' is also tapered in proximity to first ring gear weldment surface 118' to establish a first continuous weldment groove which, in turn, defines the first weldment junction (WJ1) between first case member 108' and ring gear 104'. Likewise, portions of pilot flange 254 and pilot groove 256 adjacent to second case weldment surface 124' and second ring gear weldment surface 122' are tapered to establish a second continuous weldment groove which, in turn, defines the second weldment junction (WJ2) between second case member 110' and ring gear 104'. Following assembly of ring gear 104' onto two-piece differential carrier 102', a welding operation is performed to establish a first weld seam 270 within the first weld groove and establish a second weld seam 272 within the second weld groove. Weld seams 270 and 272 may be continuous or intermittently located within the corresponding weld grooves. A clamping force may again be applied to opposite ends of differential carrier 102' to maintain aligned retention of locator flange 250 within carrier groove 252.

Case members 108', 110' can be stamped high strength components or alternatively can be forged components that are heat treated to achieve a martensitic structure in preparation for subsequent weldment to ring gear 104'. Regardless of the type of material selected, a "piloted" two-piece differential carrier 102' is provided utilizing a locator flange and annular groove arrangement. Likewise, ring gear 104' is "piloted" relative to differential carrier 102' via a case flange and ring gear groove arrangement. Depending on tolerances, two-piece differential carrier 102' may be assemblied and then have its outer diameter surfaces machined/ground to accommodate run-out prior to ring gear 106' being installed thereon and welded thereto.

Figure 10:
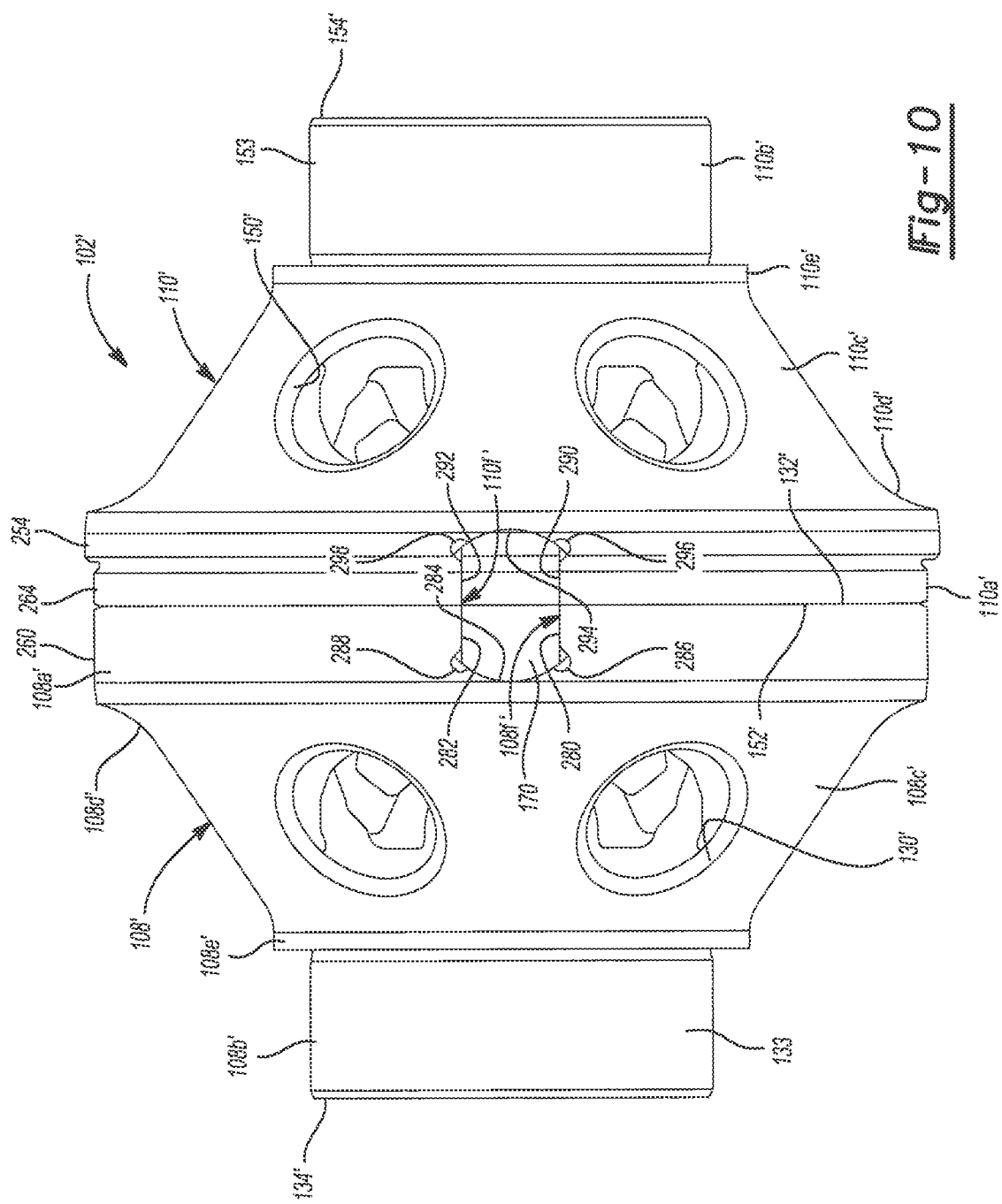
FIG. 10 is an assembled view of the two-piece differential carrier associated with the differential assembly shown in FIG. 8 and which better illustrates a crosspin mounting configuration.
Figure 11:
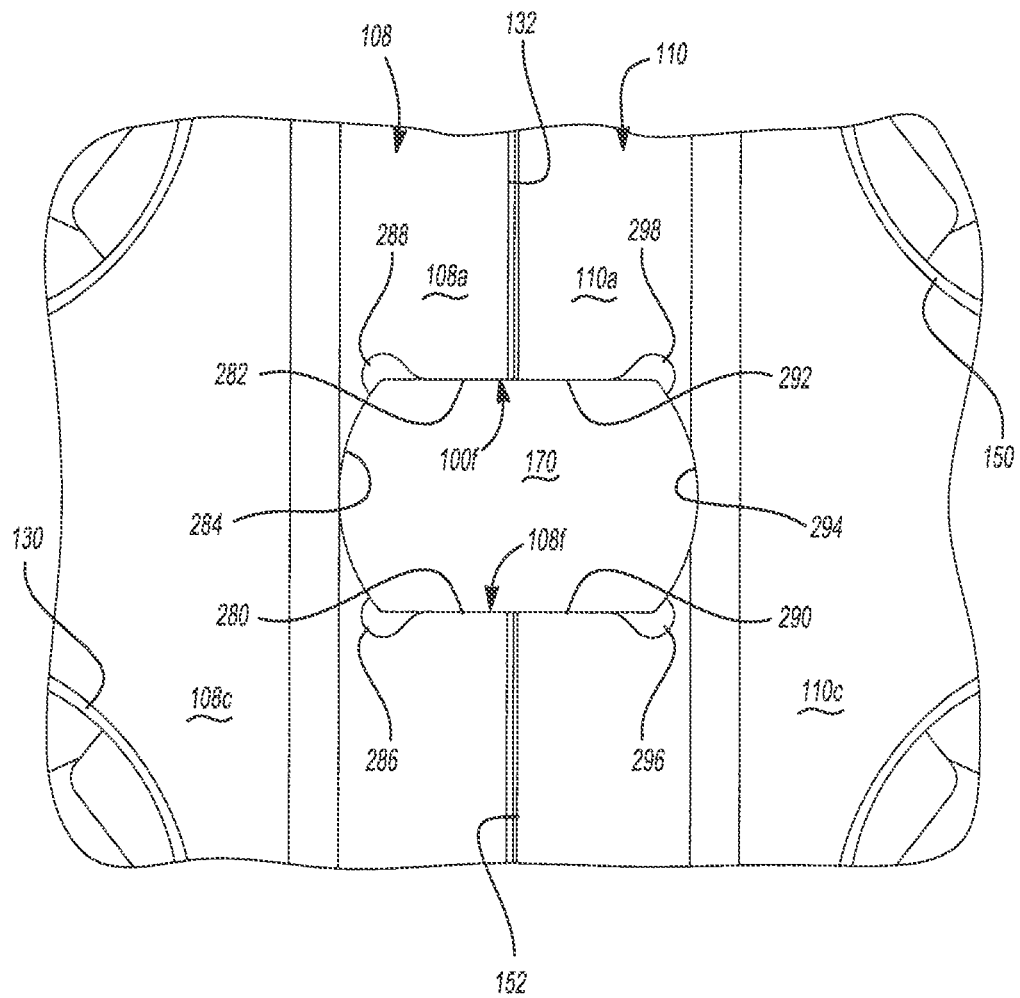
FIG. 11 is an enlarged view of the two-piece differential carrier associated with the differential assembly shown in FIGS. 3-6 illustrating a crosspin mounting configuration similar to FIG. 10.

Referring now to FIG. 10, a crosspin mounting arrangement is shown in conjunction with case members 108', 110' of two-piece differential carrier 102'. Specifically, a non-circular crosspin mounting aperture is configured to include a first case aperture 108f' formed in first cylindrical segment 108a' of first case member 108' and which is alignable with a second case aperture 110f' formed in first cylindrical segment 110a' of second case member 110'. First case aperture 108f' is shown to include a pair of laterally-spaced and axially-extending side surfaces 280, 282 which extend from first end surface 132' and which are interconnected via an arcuate end surface 284. A first full-depth radius or relief 286 is formed between first side surface 280 and end surface 284 while a second full-depth radius or relief 288 is formed between second side surface 282 and end surface 284. Second case aperture 110f' is shown to include a pair of laterally-spaced and axially-extending side surfaces 290, 292 which extend from first end surface 152' and which are interconnected via an arcuate end surface 292. First and second full-depth radiuses or reliefs 296, 298 are respectively formed between side surfaces 290, 292 and arcuate end surface 294. Reliefs 286, 288, 296, 298 are configured to significantly reduce stress levels in comparison to a conventional non-relieved edge that may result in contact with corners of the crosspin. In particular, this feature of the present disclosure results in compressive stresses which allow deformation on the planar side surfaces versus tension stresses which could result in undesirable cracking. Additionally, the larger radius on the ends of the crosspin which mate with arcuate end surfaces 284, 294 also assist in load sharing that otherwise would contact planar surfaces of the differential carrier during forward and reverse operation of the motor vehicle.

In summary, the present disclosure provides a differential assembly configured to permit a ring gear to be aligned and retained relative to first and second case members of a two-piece differential carrier for welding along a first weld joint established between the ring gear and the first case member and a second weld joint established between the ring gear and the second case member. The first and second case members may be symmetrical formed of stamped material and further include piloting/stopping features for aligning and retaining a locator flange on the ring gear within a carrier groove formed in the two-piece differential carrier. The specific configuration of the crosspin aperture is provided to reduce stresses associated with loading of the crosspin into the differential carrier.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A differential assembly, comprising:
a differential carrier having a first case member and a second case member together defining an internal gearset chamber, said first case member having a first groove surface and a first case weldment surface, said second case member having a second groove surface and a second case weldment surface, said first and second case members adapted to align said first and second groove surfaces to define an annular carrier groove;

a differential gearset installed within said gearset chamber of said differential carrier; and a ring gear configured to surround said differential carrier and having an annular locator flange adapted to be located and retained within said carrier groove, said ring gear defining a first ring gear weldment surface adapted to be aligned with said first case weldment surface to establish a first weldment junction between said ring gear and said first case member, said ring gear further defining a second ring gear weldment surface adapted to be aligned with said second case weldment surface to establish a second weldment junction between said ring gear and said second case member;

wherein said ring gear is welded to said differential carrier by a first weld seam located along said first weldment junction and a second weld seam located along said second weldment junction, wherein said locator flange extends inwardly from an inner surface of a hub segment of said ring gear, wherein said inner diameter surface of said hub segment defines a first ring gear mount surface configured to be aligned with a first carrier mount surface formed on an outer surface of said first case member, and wherein said inner diameter surface of said hub segment further defines a second ring gear mount surface configured to be aligned with a second carrier mount surface formed on an outer surface of said second case member.

2. The differential assembly of claim 1 wherein said first ring gear mount surface engages said first carrier mount surface when said locator flange engages said first groove surface of said carrier groove, and wherein said second ring gear mount surface engages said second carrier mount surface when said locator flange engages said second groove surface of said carrier groove.

3. The differential assembly of claim 2 wherein said first groove surface and said first carrier mount surface are machined into said outer surface of said first case member, and wherein said second groove surface and said second carrier mount surface are machined into said outer surface of said second case member.

4. The differential assembly of claim 2 wherein said first ring gear weldment surface is formed on a first edge portion of said hub segment and said first case weldment surface aligns with said first ring gear weldment surface to define a first weld groove, wherein said second ring gear weldment surface is formed on a second edge portion of said hub segment and said second case weldment surface aligns with said second ring gear weldment surface to define a second weld groove, wherein said first weldment junction is defined by said first weld seam located within said first weld groove, and wherein said second weldment junction is defined by said second weld seam being located within said second weld groove.

5. The differential assembly of claim 4 wherein said first and second weld grooves are continuous and uninterrupted.

6. The differential assembly of claim 1 wherein said first and second weld seams are continuous and uninterrupted.

7. The differential assembly of claim 1 wherein said first and second case members are stamped components made of steel.

8. The differential assembly of claim 1 wherein said first and second case members are forged components heat treated to define a martensitic structure.

9. The differential assembly of claim 1 wherein said annular carrier groove is continuous and uninterrupted such that a continuous and uninterrupted locator flange is retained therein.

10. A differential assembly, comprising:

a two-piece differential carrier having a first case member and a second case member together defining an internal gearset chamber, said first case member having an end face surface formed with an axially-extending locator flange, said second case member having an end face surface arranged to matingly engage said end face surface of said first case member and which is formed to include a carrier groove configured to enclose and retain said locator flange therein, said first case member defining a first case weldment surface and a first outer mounting surface, and said second case member defining a second outer mounting surface, a pilot flange extending radially from said second outer mounting surface, and a second case weldment surface formed on said pilot flange;

a differential gearset installed within said gearset chamber of said two-piece differential carrier; and a ring gear configured to surround said differential carrier and having an inner mounting surface and a pilot groove formed in said inner mounting surface, said inner mounting surface adapted to be aligned with said first said first mounting surface on said first case member and with said second mounting surface on said second case member said pilot groove adapted to be located and retained in abutting engagement with said pilot flange, said ring gear defining a first ring gear weldment surface adapted to be aligned with said first case weldment surface to establish a first weldment junction between said ring gear and said first case member, said ring gear further defining a second ring gear weldment surface adapted to be aligned with said second case weldment surface to establish a second weldment junction between said ring gear and said second case member;

wherein said ring gear is welded to said differential carrier by a first weld seam located along said first weldment junction and a second weld seam located along said second weldment junction.

11. The differential assembly of claim 10 wherein said first and second weld seams are continuous and uninterrupted.

12. The differential assembly of claim 10 wherein said carrier groove is continuous and uninterrupted, and wherein said locator flange is continuous and uninterrupted.

13. The differential assembly of claim 10 wherein said first and second case members are stamped components made from high strength steel.

14. A differential assembly, comprising:

a differential carrier having a first case member and a second case member together defining an internal gearset chamber, said first case member having a first carrier mount surface, a first groove surface and a first case weldment surface, said second case member having a second carrier mount surface, a second groove surface and a second case weldment surface, said first and second case members adapted to align said first and second groove surfaces to define an annular carrier groove;

a differential gearset installed within said gearset chamber of said differential carrier; and a ring gear configured to surround said differential carrier, said ring gear defining a first ring gear weldment surface adapted to be aligned with said first case weldment surface to establish a first weldment junction between said ring gear and said first case member, said ring gear further defining a second ring gear weldment surface adapted to be aligned with said second case weldment surface to establish a second weldment junction between said ring gear and said second case member, said ring gear having a hub segment having an inner surface from which an annular locator flange extends and which is configured to be disposed within said carrier groove, said inner surface of said hub segment defining a first ring gear mount surface on one side of the locator flange configured to be aligned with said first carrier mount surface when said locator flange is disposed within said first groove surface, and said inner surface of said hub segment defining a second ring gear mount surface on an opposite side of said locator flange configured to be aligned with said second carrier mount surface when said locator flange is disposed within said second groove surface;
wherein said ring gear is welded to said differential carrier by a first weld seam located along said first weldment junction and a second weld seam located along said second weldment junction.

15. The differential assembly of claim 14 wherein said first groove surface and said first carrier mount surface are machined into an outer surface of said first case member, and wherein said second groove surface and said second carrier mount surface are machined into an outer surface of said second case member.

16. The differential assembly of claim 14 wherein said first case weldment surface aligns with said first ring gear weldment surface to define a first weld groove, wherein said second case weldment surface aligns with said second ring gear weldment surface to define a second weld groove, wherein said first weldment junction is defined by said first weld seam being located within said first weld groove, and wherein said second weldment junction is defined by said second weld seam being located within said second weld groove.

17. The differential assembly of claim 16 wherein said first and second weld grooves are continuous and uninterrupted.

18. The differential assembly of claim 14 wherein said carrier groove is continuous and uninterrupted such that a continuous and uninterrupted locator flange is retained therein.

19. The differential assembly of claim 1 wherein said first case weldment surface aligns with said first ring gear weldment surface to define a first weld groove, wherein said second case weldment surface aligns with said second ring gear weldment surface to define a second weld groove, wherein said first weldment junction is defined by said first weld seam being located within said first weld groove, and wherein said second weldment junction is defined by said second weld seam being located within said second weld groove.

* * * * *